(12) United States Patent  (10) Patent No.: US 9,112,881 B2
Maes  (45) Date of Patent: *Aug. 18, 2015

(54) PRESENCE-BASED CALLER IDENTIFICATION

(75) Inventor: Stèphane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/957,709

(22) Filed: Dec. 1, 2010

(65) Prior Publication Data
US 2011/0141948 A1 Jun. 16, 2011

Related U.S. Application Data

(60) Provisional application No. 61/286,989, filed on Dec. 16, 2009, provisional application No. 61/287,000, filed on Dec. 16, 2009.

(51) Int. Cl.
H04L 29/06 (2006.01)
(52) U.S. Cl.
CPC ........ *H04L 65/1063* (2013.01); *H04L 65/1006* (2013.01); *H04L 65/1096* (2013.01)
(58) Field of Classification Search
CPC .................................................. H04L 65/1063
USPC ........................................ 370/259, 260, 270
See application file for complete search history.

(56) References Cited

U.S. PATENT DOCUMENTS

| 6,987,840 | B1 | 1/2006 | Bosik et al. |
| 7,035,390 | B2 | 4/2006 | Elliott |
| 7,203,294 | B2 | 4/2007 | Carnazza et al. |
| 7,269,162 | B1 | 9/2007 | Turner |
| 7,606,866 | B2 | 10/2009 | Mora |
| 7,620,160 | B2 | 11/2009 | Tidwell et al. |
| 7,668,157 | B2 | 2/2010 | Weintraub et al. |
| 8,688,822 | B2 | 4/2014 | Maes |
| 8,964,955 | B2 | 2/2015 | Maes |
| 2001/0031641 | A1 | 10/2001 | Ung et al. |
| 2002/0087649 | A1 | 7/2002 | Horvitz |

(Continued)

OTHER PUBLICATIONS

U.S. Appl. No. 11/424,451, filed Jun. 15, 2006, Office Action dated Aug. 9, 2011, 19 pages.

(Continued)

*Primary Examiner* — Man Phan
*Assistant Examiner* — Kevin Lee
(74) *Attorney, Agent, or Firm* — Kilpatrick Townsend & Stockton LLP

(57) ABSTRACT

Embodiments of the invention provide systems and methods for using a presence-based network to provide caller identification information. According to one embodiment, a method of providing information related to a communication can comprise receiving a publication of one or more presence attributes. The one or more presence attributes can comprise at least one attribute indicating caller identification information. A presence profile can be associated with an entity. For example, the entity can comprises a party to the communication. The presence profile can be updated based on the received presence attributes. The attribute indicating caller identification information can be provided to one or more subscribers to the presence information such as the entity associated with the presence profile, another party to the communication, another authorized principal, etc.

16 Claims, 6 Drawing Sheets

(56) References Cited

U.S. PATENT DOCUMENTS

| | | | |
|---|---|---|---|
| 2003/0065788 A1 | 4/2003 | Salomaki | |
| 2003/0206619 A1 | 11/2003 | Curbow et al. | |
| 2003/0217142 A1 | 11/2003 | Bobde et al. | |
| 2004/0002958 A1 | 1/2004 | Seshadri et al. | |
| 2004/0003042 A1 | 1/2004 | Horvitz et al. | |
| 2004/0030753 A1 | 2/2004 | Horvitz | |
| 2004/0039630 A1 | 2/2004 | Begole et al. | |
| 2004/0122901 A1* | 6/2004 | Sylvain | 709/206 |
| 2004/0249776 A1 | 12/2004 | Horvitz et al. | |
| 2005/0021645 A1 | 1/2005 | Kulkarni et al. | |
| 2005/0080867 A1 | 4/2005 | Malik et al. | |
| 2005/0228882 A1 | 10/2005 | Watanabe et al. | |
| 2005/0259802 A1 | 11/2005 | Gray et al. | |
| 2005/0273673 A1 | 12/2005 | Gassoway | |
| 2006/0117050 A1 | 6/2006 | John et al. | |
| 2006/0190117 A1 | 8/2006 | Weczorek et al. | |
| 2006/0248185 A1 | 11/2006 | Morris | |
| 2007/0027921 A1 | 2/2007 | Alvarado et al. | |
| 2007/0081640 A1 | 4/2007 | Jachner | |
| 2007/0124393 A1 | 5/2007 | Maes | |
| 2007/0153709 A1* | 7/2007 | Choi | 370/254 |
| 2007/0162343 A1 | 7/2007 | Landesmann | |
| 2007/0233859 A1 | 10/2007 | Zhao et al. | |
| 2007/0291859 A1 | 12/2007 | Maes | |
| 2008/0034367 A1 | 2/2008 | Patrick et al. | |
| 2008/0040441 A1 | 2/2008 | Maes | |
| 2008/0313329 A1* | 12/2008 | Wang et al. | 709/224 |
| 2009/0177601 A1 | 7/2009 | Huang et al. | |
| 2011/0142209 A1 | 6/2011 | Maes | |
| 2011/0185029 A1 | 7/2011 | Jain et al. | |
| 2013/0239182 A1 | 9/2013 | Pierson et al. | |

OTHER PUBLICATIONS

U.S. Appl. No. 11/424,451, filed Jun. 15, 2006, Final Office Action dated Jan. 19, 2012, 20 pages.

U.S. Appl. No. 11/481,440, filed Jul. 5, 2006, Final Office Action dated Nov. 8, 2011, 18 pages.

Author Unknown, "Synchronizing and Managing Mobile Devices," iAnywhere, Inc., One Sybase Drive, Dublin, CA, www.iAnywhere.com, Copyright 2006, 8 pages.

Author Unknown, "Understanding SIP: Today's Hottest Communications Protocal Comes of Age," White Paper, Ubiquity Software Corporation, Limited www.ubiquitysoftware.com, 2004, 6 pages.

Author Unknown, E-Mail Notification, Open Mobile Alliance Ltd., Candidate Version 1.0, Jun. 14, 2004, 21 pages.

Graham, Steve et al., "Publish-Subscribe Notification for Web Services," Akamai Technologies et al., version 1.0, Mar. 5, 2004, 19 pages.

Leion, Henrik, "Presence Aware Software Using SIP," White Paper, Enea Epact AB, Teknikringen 8 SE-58330 Linkoping, Feb. 2005, 10 pages.

U.S. Appl. No. 11/424,451, filed Jun. 15, 2006, Advisory Action dated May 18, 2010, 3 pages.

U.S. Appl. No. 11/424,451, filed Jun. 15, 2006, Final Office Action dated Mar. 11, 2010, 27 pages.

U.S. Appl. No. 11/424,451, filed Jun. 15, 2006, Final Office Action dated May 11, 2009, 20 pages.

U.S. Appl. No. 11/424,451, filed Jun. 15, 2006, Office Action dated Oct. 19, 2010, 27 pages.

U.S. Appl. No. 11/424,451, filed Jun. 15, 2006, Office Action dated Dec. 8, 2008, 20 pages.

U.S. Appl. No. 11/424,451, filed Jun. 15, 2006, Office Action dated Sep. 18, 2009, 28 pages.

U.S. Appl. No. 11/424,451, filed Jun. 15, 2006, Final Office Action dated Mar. 18, 2011, 18 pages.

U.S. Appl. No. 11/424,451, filed Jun. 15, 2006, Advisory Action dated May 31, 2011, 3 pages.

U.S. Appl. No. 11/481,440, filed Jul. 5, 2006, Advisory Action dated Mar. 4, 2010, 3 pages.

U.S. Appl. No. 11/481,440, filed Jul. 5, 2006, Final Office Action dated Dec. 9, 2009, 12 pages.

U.S. Appl. No. 11/481,440, filed Jul. 5, 2006, Office Action dated May 10, 2010, 15 pages.

U.S. Appl. No. 11/481,440, filed Jul. 5, 2006, Office Action dated May 11, 2009, 13 pages.

U.S. Appl. No. 11/481,440, filed Jul. 5, 2006, Final Office Action dated Dec. 14, 2010, 20 pages.

U.S. Appl. No. 11/481,440, filed Jul. 5, 2006, Advisory Action dated Feb. 23, 2011, 2 pages.

U.S. Appl. No. 11/481,440, filed Jul. 5, 2006, Office Action dated Jun. 1, 2011, 19 pages.

U.S. Appl. No. 12/957,726, Non-Final Office Action mailed on Oct. 3, 2013, 12 pages.

U.S. Appl. No. 11/424,451, filed Jun. 15, 2006, Non-Final Office Action dated Oct. 22, 2013, 24 pages.

U.S. Appl. No. 11/481,440, filed Jul. 5, 2006, Notice of Allowance dated Nov. 13, 2013, 27 pages.

U.S. Appl. No. 11/424,451, Notice of Allowance mailed on Apr. 8, 2014, 7 pages.

U.S. Appl. No. 12/957,726, Final Office Action mailed on Feb. 5, 2014, 15 pages.

U.S. Appl. No. 12/957,726, Advisory Action mailed on Apr. 14, 2014, 3 pages.

U.S. Appl. No. 12/957,726, Non Final Office Action mailed on May 9, 2014, 13 pages.

U.S. Appl. No. 12/957,726, Notice of Allowance mailed on Sep. 3, 2014, 9 pages.

\* cited by examiner

PRESENCE-BASED CALLER IDENTIFICATION

CROSS-REFERENCES TO RELATED APPLICATIONS

The present application claims benefit under 35 USC 119 (e) of U.S. Provisional Application No. 61/286,989, filed on Dec. 16, 2009 by Maes et al. and entitled "Presence-Based Caller Identification," of which the entire disclosure is incorporated herein by reference for all purposes.

This application is also related to the following co-pending applications, of which the entire disclosure of each is incorporated herein by reference for all purposes: U.S. patent application Ser. No. 12/045,220 filed Mar. 10, 2008 by Maes et al. and entitled "PRESENCE-BASED EVENT DRIVEN ARCHITECTURE"; U.S. patent application Ser. No. 11/424,451 filed Jun. 15, 2006 by Maes and entitled "PAST PRESENCE HINTS"; and U.S. Provisional Patent Application No. 61/287,000 filed Dec. 16, 2009 by Maes and entitled "PRESENCE-BASED MESSAGE WAITING INDICATOR AND MISSED CALLS."

BACKGROUND OF THE INVENTION

Embodiments of the present invention relate generally to providing information related to a communication session and more particularly to using a presence-based network for providing caller identification information.

Today there are proprietary and standard based ways to expose caller identification information to a phone, either a hard phone or a soft phone. These systems and methods involve signaling or messaging information, i.e., the caller identification information is passed as part of the signaling in the from an address in Session Initiation Protocol (SIP) header or derivable from it or in a separate message. Legacy system such as various Public Switched Telephone Networks (PSTN), Internet, or PBXes have many proprietary or standard based variations to provide caller identification information.

However, none of these approaches allow many standard clients to be able to display the caller identification information throughout a call and possibly notify in any desirable way at the onset. For example, many Voice Over Internet Protocol (VOIP) and other clients not specifically adapted to work with a particular network, PBX or other equipment cannot handle provided caller identification information. Existing methods and systems also do not allow other clients or authorized principals, i.e., other than the recipient of the call, to receive the caller identification details and do not model handset or device availability e.g., on hook and/or off hook. Furthermore, these methods and systems do not provide a stateful/persistent model of the communication state of a terminal or a principal and do not similarly or symmetrically handle outbound calls as well as inbound calls. Hence, there is a need for improved methods and systems for providing information related to a communication such as caller identification information.

BRIEF SUMMARY OF THE INVENTION

Embodiments of the invention provide systems and methods for using a presence-based network to provide caller identification information. Since presence data models as used with eXtensible Messaging and Presence Protocol (XMPP), Session Initiation Protocol (SIP), SIP Instant Messaging and Presence Leveraging Extensions (SIP/SIMPLE), Open Mobile Alliance (OMA) SIP/SIMPLE presence eXtensible Markup Language (XML) Document Management (XDM) enablers etc. are extensible (i.e. new attributes can be defined), a presence attribute can be defined for caller identification information that can then be used, i.e., published/subscribed, as with other presence attributes. However, it should be noted that embodiments of the present invention are not limited to use with SIP/SIMPLE, XMPP, or any other specific protocol. Rather, embodiments of the present invention can be implemented using any other presence solution including, for example, Instant Messaging and Presence Service (IMPS)/Wireless village, Parlay/Network presence, and presence associated with Multimedia IM messages like Skype, Google Talk, MSN messenger, Y!, AIM etc.

According to one embodiment, a method of providing information related to a communication can comprise receiving a publication of one or more presence attributes. The one or more presence attributes can comprise at least one attribute indicating caller identification information. A presence profile can be associated with an entity. For example, the entity can comprises a party to the communication. The presence profile can be updated based on the received presence attributes. The attribute indicating caller identification information can be provided to one or more subscribers to the presence information such as the entity associated with the presence profile, another party to the communication, another authorized principal, etc.

In some cases, the entity associated with the presence profile can comprise a recipient of the communication, i.e., a "callee." In such cases, receiving the publication of the one or more presence attributes can comprise receiving the one or more presence attributes from an agent associated with an originator of the communication. The attribute indicating the caller identification information can then be provided to the entity. For example, providing the attribute indicating the caller identification information to the entity can comprise providing a notification of a change in the attribute indicating the caller identification information. In another example, a request can be received from the entity for at least one of the presence attributes of the presence profile. In such a case, the attribute indicating the caller identification information can be provided to the entity in response to the request.

In other cases, the entity associated with the presence profile may be the originator of the communication, i.e., a "caller." In such cases, receiving the publication of the one or more presence attributes can comprise receiving the one or more presence attributes from an agent associated with the entity. The attribute indicating the caller identification information can then be provided to a recipient of the communication. For example, providing the attribute indicating the caller identification information to the recipient can comprise providing a notification of a change in the attribute indicating the caller identification information. In another example, a request can be received from an agent associated with the recipient for at least one of the presence attributes of the presence profile. In such a case, the attribute indicating the caller identification information can be provided to the recipient in response to the request.

The attribute indicating the caller identification information can be persisted based on one or more policies. Furthermore, the attribute indicating the caller identification information can be expired based on one or more policies. Such a persisted attribute can be used to provide logging of the communication, billing for the communication, etc. In some cases, the one or more presence attributes can further comprise at least one attribute indicating a status of a device associated with the entity and/or at least one attribute indicating presence information.

According to another embodiment, a system can comprise a communication network adapted to support a communication session. A presence server can be communicatively coupled with the communication network. The presence server can be adapted to receive a publication of one or more presence attributes. The one or more presence attributes can comprise at least one attribute indicating caller identification information. The presence server can update a presence profile associated with an entity based on the received presence attributes. The entity associated with the presence profile can comprise a party to the communication session.

An agent associated with an originator of the communication session can also be communicatively coupled with the communication network. In such a case, the presence server can receive the publication of the one or more presence attributes from the agent associated with the originator of the communication session. The system can further comprise an agent associated with the entity which is also communicatively coupled with the communication network. The presence server can be further adapted to provide the attribute indicating the caller identification information to the agent associated with the entity. For example, the presence server can provide the attribute indicating the caller identification information to the agent associated with the entity by providing a notification of a change in the attribute indicating the caller identification information. In another example, the presence server can be adapted to receive a request from the agent associated with the entity for at least one of the presence attributes of the presence profile. In such a case, the presence server can provide the attribute indicating the caller identification information to the entity in response to the request.

Additionally or alternatively, the presence server can receive the publication of the one or more presence attributes from the agent associated with the entity. In such cases, the presence server can be further adapted to provide the attribute indicating the caller identification information to the agent associated with the recipient of the communication session. For example, the presence server can provide the attribute indicating the caller identification information to the agent associated with the recipient by providing a notification of a change in the attribute indicating the caller identification information. In another example, the presence server can be further adapted to receive a request from the agent associated with the recipient for at least one of the presence attributes of the presence profile. In such cases, the presence server can provide the attribute indicating the caller identification information to the agent associated with the recipient in response to the request.

The presence server can be further adapted to persist the attribute indicating the caller identification information based on one or more policies. Furthermore, the presence serer can be adapted to expire the attribute indicating the caller identification information based on one or more policies. Based one the persisted attributes, the presence serer can be further adapted to log communications, bill for communications, etc. Additionally or alternatively, the one or more presence attributes can comprise one or more attributes indicating a status of a device associated with the entity, one or more attributes indicating presence information, and/or other attributes.

According to yet another embodiment, a machine-readable medium can have stored thereon a series of instructions which, when executed by a processor, cause the processor to provide information related to a communication by receiving a publication of one or more presence attributes. The one or more presence attributes can comprise at least one attribute indicating caller identification information. A presence profile can be associated with an entity. For example, the entity can comprises a party to the communication. The presence profile can be updated based on the received presence attributes.

DETAILED DESCRIPTION OF THE INVENTION

Figure 1:
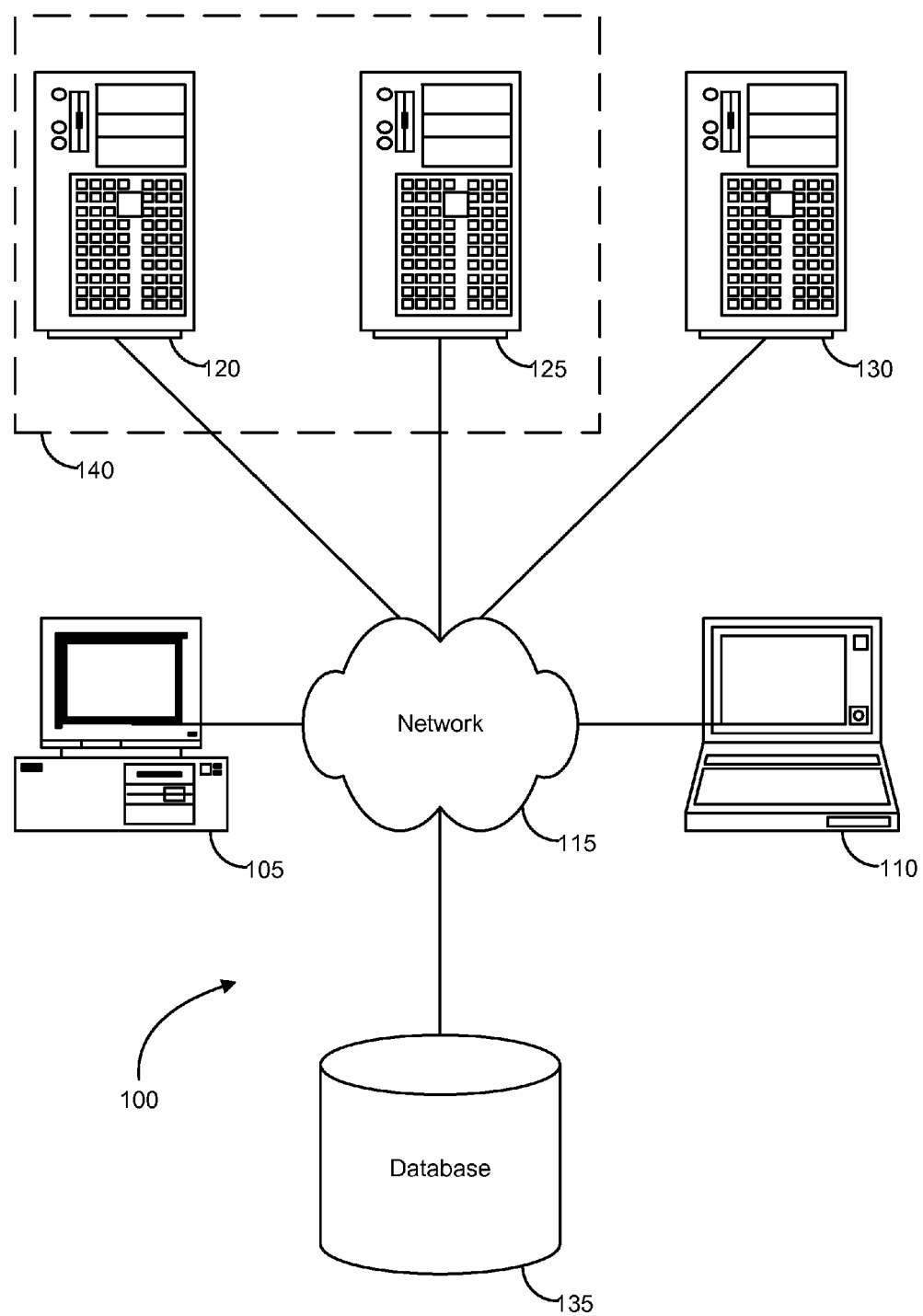
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine readable medium. A processor(s) may perform the necessary tasks.

Embodiments of the invention provide systems and methods for using a presence-based network to provide caller identification information. Generally speaking, providing information related to a communication can comprise receiving a publication of one or more presence attributes. The one or more presence attributes can comprise at least one attribute indicating caller identification information. A presence profile can be associated with an entity. For example, the entity can comprises a party to the communication. The presence profile can be updated based on the received presence attributes. The attribute indicating caller identification information can be provided to one or more subscribers to the presence information such as the entity associated with the presence profile, another party to the communication, another authorized principal, etc.

In some cases, the entity associated with the presence profile can comprise a recipient of the communication, i.e., a "callee." In such cases, receiving the publication of the one or more presence attributes can comprise receiving the one or more presence attributes from an agent associated with an originator of the communication. The attribute indicating the caller identification information can then be provided to the entity. For example, providing the attribute indicating the caller identification information to the entity can comprise providing a notification of a change in the attribute indicating the caller identification information. In another example, a request can be received from the entity for at least one of the presence attributes of the presence profile. In such a case, the attribute indicating the caller identification information can be provided to the entity in response to the request.

In other cases, the entity associated with the presence profile may be the originator of the communication, i.e., a "caller." In such cases, receiving the publication of the one or more presence attributes can comprise receiving the one or more presence attributes from an agent associated with the entity. The attribute indicating the caller identification information can then be provided to a recipient of the communication. For example, providing the attribute indicating the caller identification information to the recipient can comprise providing a notification of a change in the attribute indicating the caller identification information. In another example, a request can be received from an agent associated with the recipient for at least one of the presence attributes of the presence profile. In such a case, the attribute indicating the caller identification information can be provided to the recipient in response to the request.

According to one embodiment, a presence-based network for providing caller identification information as described herein can be implemented according to the methods and systems described in the Related Application entitled "Presence-Based Event Driven Architecture" referenced above. Described therein are systems and methods for using a presence-based network for monitoring of systems, devices, or agents. More specifically, embodiments of the Related Application provide for use of a presence network to implement systems such as an Event Driven Architecture (EDA) by extending a presence profile to include attributes indicating information other than or in addition to presence information. Presence information as conventionally defined is a transient state of a principal that can be used by other entities to make a decision about how to best communicate with the principal. A principal can be defined as an entity that has an identity, that is capable of providing consent and other data, and to which authenticated actions are done on its behalf Thus, as described in the Related Application, a principal, referred to as a monitored system or device, can be any device, system, agent, application, individual, etc. Furthermore, the presence attributes described therein provide for using presence attributes to identify or indicate information related to the principal. According to the embodiments described herein, such information can include, but is not limited to, caller identification information, i.e., information identifying a participant in a communication session such as a call. As known in the art, such identifying information can comprise a name, phone number, address, and/or other identifying information.

As noted in the Related Application, since presence data models as used with Extensible Messaging and Presence Protocol (XMPP), Session Initiation Protocol (SIP), SIP Instant Messaging and Presence Leveraging Extensions (SIMPLE), OMA SIP/SIMPLE presence XML Document Management (XDM) enablers etc. are extensible (i.e. new attributes can be defined), a presence attribute can be defined for any type of information of a device, system, agent, or other entity to be monitored that can then be used, i.e., published/subscribed. However, as noted above, embodiments of the present invention are not limited to use with SIP/SIMPLE, XMPP, or any other specific protocol. Rather, embodiments of the present invention can be implemented using any other presence solution including, for example, Instant Messaging and Presence Service (IMPS)/Wireless village, Parlay/Network presence, and presence associated with Multimedia IM messages like Skype, Google Talk, MSN messenger, Y!, AIM etc. Regardless of the exact protocol and/or presence solution used, presence information can be obtained using a subscribe/publish model wherein a principal publishes presence attributes to a presence server which in turn notifies authorized subscribers, referred to herein as listeners, of the information or change of information. Thus, when the information of the monitored system changes, such as when a call or communication session is initiated and caller identification information is provided or obtained, the presence attributes in the presence profile of that system can be updated and the update can be published to authorized listeners via a presence server. Additionally or alternatively, presence information can be obtained from the presence server by the listener interrogating or querying the server which in turn responds to the query. According to one embodiment, presence information can additionally or alternatively be published by a presence network agent. Such a presence network agent can additionally or alternatively be adapted to monitor the system or elements of the system by receiving notifications or querying the system for presence attributes.

Updating the presence profile, notifying subscribers/listeners, and/or responding to queries, etc. can be subject to the application of one or more policies by the presence server. As used herein the term policy refers to a combination of one or more conditions and a set of one or more associated actions to be performed upon the condition(s) being satisfied. That is, the policies can define conditions to be met and corresponding actions to be taken when receiving a publication of a presence attribute, notifying subscribers/listeners, responding to queries, etc. For example, the policies can define which subscribers or listeners are authorized to receive a notification or access a presence profile or attribute. Additionally or alternatively, the policies can define conditions and actions for use by the presence service to determine what information is shown to who, how is it transformed, under what conditions etc. Other possible policies, i.e., any combination of any condition and any action, are contemplated and considered to be within the scope of the present invention. According to one embodiment, application of policies, handling of events, and implementation of the attributes can be performed as described in the Related Application entitled "Past Presence Hints" referenced above. That is, presence attributes as described herein can represent past presence hints or information as described in the referenced application and can be treated according to the embodiments described therein including but not limited to possible persistence and/or expiration of attributes etc. Additional details of various embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
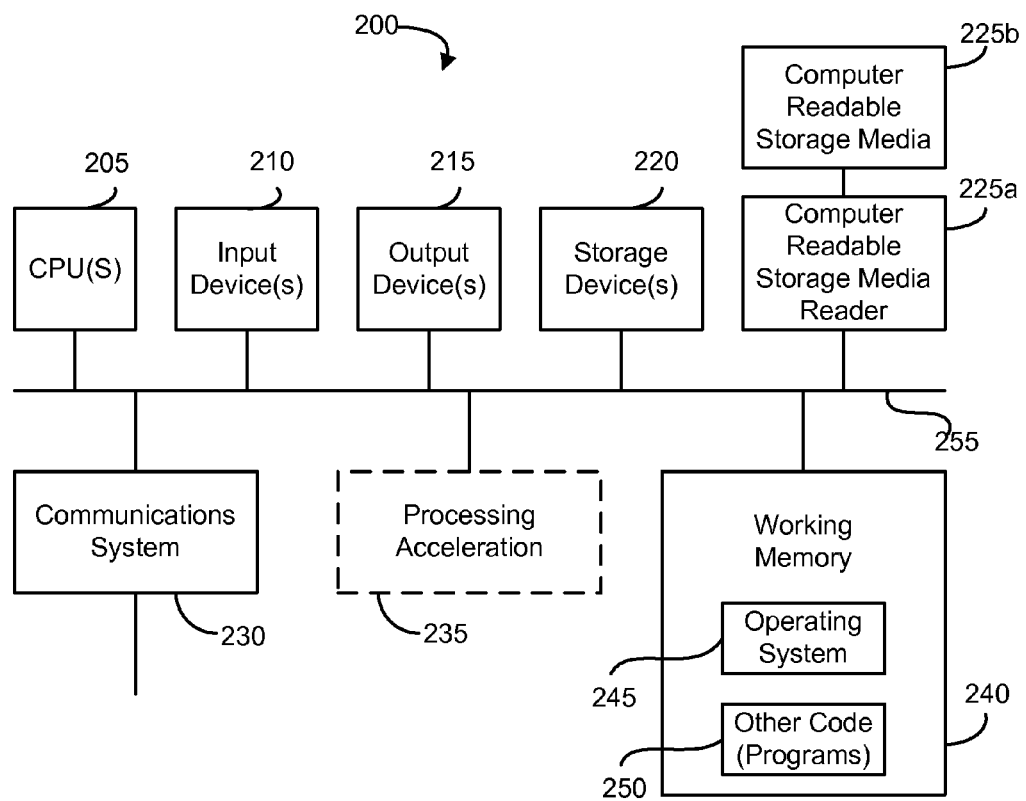
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Embodiments of the invention provide systems and methods for using a presence-based network to provide caller identification information. According to one embodiment, a presence-based network for providing caller identification information as described herein can be implemented according to the methods and systems described in the Related Application entitled "Presence-Based Event Driven Architecture" referenced above. A portion of the description of the Related Application is reproduced here for the sake of convenience. However, it should be understood that the description of this system is provided by way of example and to illustrate on possible implementation. Furthermore, it should be understood that the description of this system is not intended to limit the scope of the present invention. Rather, other implementations may depart from the details described with reference to this system without departing from the scope of the present invention.

Figure 3:
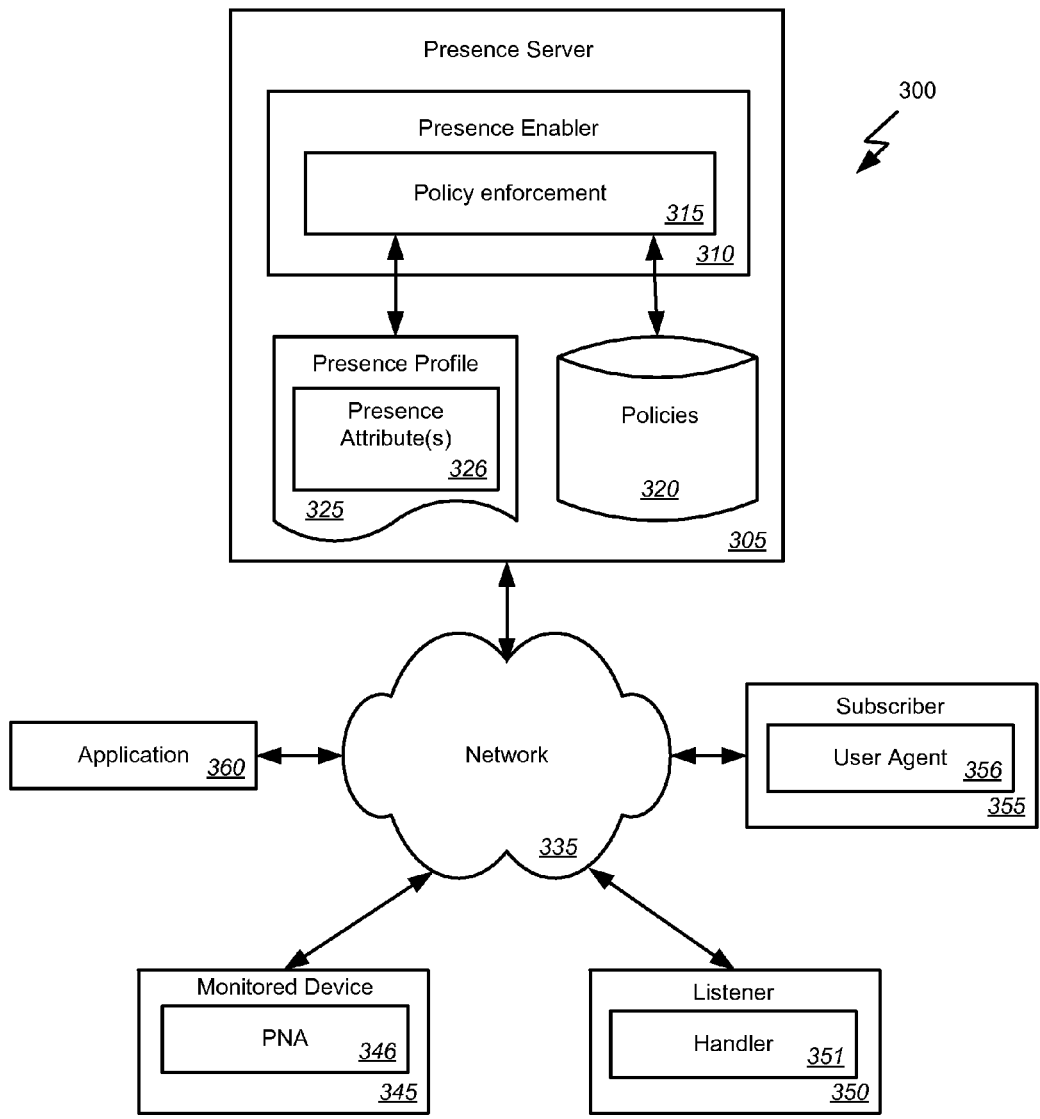
FIG. 3 is a block diagram illustrating, at a high-level, functional components of a system for monitoring a system according to one embodiment of the present invention.

FIG. 3 is a block diagram illustrating, at a high-level, functional components of a system for monitoring a system according to one embodiment of the present invention. Generally speaking, the system 300 of this example illustrates a presence network that can be adapted to provide for monitoring of systems, devices, or agents. More specifically, the system 300 includes a communications network 335. The communications network 335 can comprise any type of network such as described above. A number of devices 345 and 350 can be communicatively coupled with the communications network 335. The devices 345 and 350 can include a monitored device 345 and a listener 350. Additionally or alternatively, the system 300 can include an application 360 and/or another subscriber 355 device or system 355 communicatively coupled with the communications network 335.

Generally speaking, the monitored device 345 can comprise any device, system, application, etc. that is to be monitored and the listener 350 can be any device, system, application etc that can receive and/or react to information provided by or relating to the monitored device 345. It should be noted that the names monitored device and listener are used only to illustrate a particular device's function at a given time and are not meant to imply any limitations on the functions that can be performed by a given device. That is, any given device, system, or application can alternately or concurrently act as a monitored device 345 or listener 350.

The system can also include a presence server 305 communicatively coupled with the communications network 335. The presence server 305 can include a presence enabler 310. It should be noted that the presence enabler 310 can comprise any one or more of a number of different enablers. For example, the presence enabler 310 can comprise an XDM enabler, a Resource List Server (RLS) enabler, or other presence enabler. Furthermore, multiple enablers may be utilized and provide internal decomposition of functions between the different enablers. Any or all such enablers are considered to be represented by presence enabler 310 and are considered to be within the scope of the present invention. It should be noted and understood that, while described herein with reference to OMA SIP/SIMPLE presence and XDM enablers, other presence server approaches can be used depending upon the exact implementation and are considered to be within the scope or the present invention. Furthermore, embodiments of the present invention do not depend upon any particular technology for implementing the presence enabler, presence server, or the presence network and the exact technology used can vary depending upon the implementation without departing from the scope of the present invention.

As noted above, the presence service provided via the presence enabler 310 of the presence server 305 can maintain a set of presence profiles 325 for any number of principals participating in the service. For example, a presence profile 325 can be maintained for or related to the monitored device 345. The presence profile 325 can include a set of one or more presence attribute 326. The presence attributes 326 can include attributes identifying or related to presence information as noted above. However, the presence attributes 326 described herein are not limited to identifying or indicating presence information. Rather, embodiments of the present invention provide for using presence attributes 326 to identify or indicate any type of information related to the principal such as the monitored device 345. For example, such information can include but is not limited to a state or status, information collected or generated by an application or process, etc, as well as presence information. Additionally or alternatively, information indicated by the presence attributes can include other types of information. For example, information indicated by one or more presence attributes can include but is not limited to a multimedia document, a Uniform Resource Identifier (URI) to a document of stream, etc.

The monitored device 345 can be adapted to maintain or execute a presence agent 346. The presence agent 346 can be adapted to publish one or more presence attributes 326 to the presence profile 325 maintained by the presence server 305 and associated with the monitored device and/or presence agent 346. As noted above, the presence attribute(s) 326 published to the presence server 305 by the presence network agent 346 can comprise at least one attribute indicating information other than presence information. For example, such information can comprise state or status information of the monitored device 345 or process thereof, a reading or measurement from the monitored device 345 such as a sensor reading or measurement, information collected or generated by an application or process of the monitored device 345, etc.

The presence attributes 326 can be published to the presence server 305 by the presence agent 345 via any appropriate method, message, or signal of the underlying protocol of the communications network 335. For example, embodiments of the present invention, while not so limited, may be implemented on Session Initiation Protocol (SIP)/SIP Instant Messaging and Presence Leveraging Extensions (SIMPLE). In such cases, the presence network agent 346 can publish the presence attributes using the known SIP/SIMPLE "PUBLISH" method. However, it should be understood that use of this protocol and method is offered by way of example only and not limitation. In other implementations., various other protocols and methods may be used.

The presence server 305 can be adapted to receive the published presence attribute(s) 326 and update the presence profile 325 associated with the presence network agent 346 based on the received presence attribute(s) 326. The presence server 305, for example via policy enforcement module 315 of the presence enabler 3160, can also be adapted to apply one or more policies 320. In such cases, updating the presence profile 325 associated with the presence network agent 346 based on the received presence attribute(s) 326 can be further based on the one or more policies 320. For example, such policies can define when, how, under what conditions, etc., the presence attributes 326 can be updated.

As noted, the system 300 can also comprise a listener 350 communicatively coupled with the presence server 305 via the communications network 335. The listener can comprise any type of system, device, application, etc. and can be adapted to receive presence attributes 326 from the presence server 305. The presence server 305 can be adapted to provide at least one of the one or more presence attributes 326 of the presence profile 325 associated with the presence network agent 346 to the listener 350. For example, providing presence attributes 326 to the listener 350 can be based on a subscribe/notify model. That is, the listener 350 can be adapted to subscribe to one or more presence attributes 326 of the presence profile 325 associated with the presence network agent 346. In such a case, the presence server 305 can provide the subscribed presence attributes 326 to the listener 350 by providing a notification of a change in the presence attribute. Additionally or alternatively, the notification can be provided to application 360 and/or another subscriber 355. For example, the application 360 and/or other subscriber 355, via a user agent 356, can subscribe to the one or more presence attributes 326 of the presence profile 325 associated with the presence network agent 346 and in turn receive notification of changes in the presence attribute.

In another example, the listener 350 and/or application 360 can be adapted to request the presence attributes 326 from the presence server 305, for example via a northbound interface of the presence enabler such as an interface including but not limited to a Parlay X presence interface. The presence server 305 can provide the presence attribute 326 to the listener 350 in response to the request. The listener can include a handler 351 or other application or process for further handling of the presence attribute(s) provided by the presence server 305. That is, the handler 351 of the listener 350 may perform further processing to, for example, inform a user of the listener 350 of the attribute(s), initiate a communication, perform actions to control a process based on the attribute(s), etc.

The presence attributes 326 can be published or provided by the presence server 305 to the listener 350 via any appropriate method, message, or signal of the underlying protocol of the communications network 335. For example, embodiments of the present invention, while not so limited, may be implemented on Session Initiation Protocol (SIP). In such cases, the presence server 305 can provide the notification to the listener using the known SIP "NOTIFY" message. In another example, a request and response between the listener and presence server can be implemented using the known Hyper Text Transfer Protocol (HTTP) "GET" and "PUT" methods.

Regardless of the exact implementation, providing presence attributes to the listener 350, application 360, and/or other subscriber 355, either as a notification or in response to a request, can be based on the presence server 305 applying one or more policies 320, for example via policy enforcement module 315 of the presence enabler 310. The policies 320 can define, for example, which subscribers or listeners 350 are authorized to receive a notification or access a presence profile 325 or attribute. Additionally or alternatively, the policies 320 can define conditions and actions for use by the presence server 305 to determine what information is shown to who, how is it transformed, under what conditions etc. Other possible policies 320, i.e., any combination of any condition and any action, are contemplated and considered to be within the scope of the present invention. As noted, application of policies and handling of events can be performed as described in the application entitled "Past Presence Hints" referenced above to provide, for example, expiration of attributes etc.

Generally speaking an Event Driven Architecture (EDA) implemented on a presence network according to embodiments of the present invention can provide for handling an event published as a presence attribute 326 by a principal, i.e., by a presence network agent 346. Generally, such an EDA can provide the features and functions of a typical EDA and can include, based on the application of policies by the presence server, persistence and state management for the event. Therefore, a richer, stateful EDA and/or ESB can be implemented. So for example, a presence network agent 346 can publish a presence attribute 326 indicating an event and/or other information to a presence server 305. The presence server 305, based on the application of policies 320, can handle the event by notifying one or more listeners 350 or subscribers. Furthermore, the event can be persisted, or not, based on the application of the policies. Expiration of the events or attributes can also be managed based on policies that expire, filter, change the attributes. Each or some of the listeners 350 can include a handler 350 for further processing or handling of the event notification. Systems implemented in this way can include, by way of example and not limitation, systems for monitoring and/or controlling a system, process, application, etc., systems for handling or controlling communications, etc.

In another example, a user agent 356 operating on a subscriber device 355 can be adapted to subscribe to and receive notifications of changes to presence attributes 326 published by a principal. Thus, the user agent 356 can be adapted to monitor one or more presence attributes for administration and/or management purposes. For example, the user agent 356 can be a "watcher" that can be present on any device or application. Therefore, a status or update for a monitored system can be provided to any device that has a user agent 356 or "watcher."

In yet another example, an application 360 can be adapted to query the presence server 305 to obtain one or more presence attributes 326 of a principal. In such a case, the presence server 305 can receive the query or request from the application 360 and respond with the requested attributes. The application 360 can then use the returned attributes, for example, to test whether/when to update/report a status of the monitored system, application, device, etc. As noted, the response by the presence server 305 may be based on application on one or more policies 320. That is, the policies 320 can define whether the requestor is authorized to access the presence profile 325 and/or requested attribute. Additionally or alternatively, the policies 320 can define conditions and actions for use by the presence server 305 to determine what information is shown, how is it transformed, under what conditions etc. Other possible policies, i.e., any combination of any condition and any action, are contemplated and considered to be within the scope of the present invention.

Furthermore, as noted above, the presence attributes 326 maintained by the presence server 305 can comprise other types of content, i.e., other than a state or status of a monitored system, application, device, etc. For example, the presence attributes can comprise information indicating or including a multimedia document (e.g. XML or "XMLized" binary documents). Additionally or alternatively, the presence attributes can comprise a URI to one or more documents or streams, for example, provided by or through a media server (not shown here) or other system.

As noted above, the presence server 305, based on application of the policies 320, can provide persistence and state management for the events. So for example, a presence network agent 346 can publish a presence attribute 326 indicating an event and/or other information to a presence server 305. The presence server 305, based on the application of policies 320, can handle the event by notifying one or more listeners 350 or subscribers. Furthermore, the event can be persisted, or not, based on the application of the policies 320. Therefore, when a listener 350 or subscriber 355 connects with the network 335, it can be provided with past, persisted events, if any. Such events can be persisted for a time defined by the policies after which the events are expired as described in the application entitled Past Presence hints referenced above.

As noted above, this system 300 can be adapted to provide caller identification information. For example, the presence attributes 326 of the presence profile 325 for a principal can be defined and/or adapted to provide caller identification information. As will be seen, such information can be provided for a principal for incoming as well as outgoing calls or communications. Such attributes can be provided to one or more subscribing and/or authorized principals or listeners as described above by providing a notification of a change in the attribute(s) or in response to a query from a subscriber or other principal. Also, based on the methods and systems described therein, the presence attributes can be managed and/or handled according to one or more policies. Therefore, the attribute(s) indicating the caller identification information can be persisted based on one or more policies. Furthermore, the attribute(s) indicating the caller identification information can be expired based on one or more policies. Such a persisted attribute can be used, for example, to provide logging of the communication, billing for the communication, etc.

Figure 4:
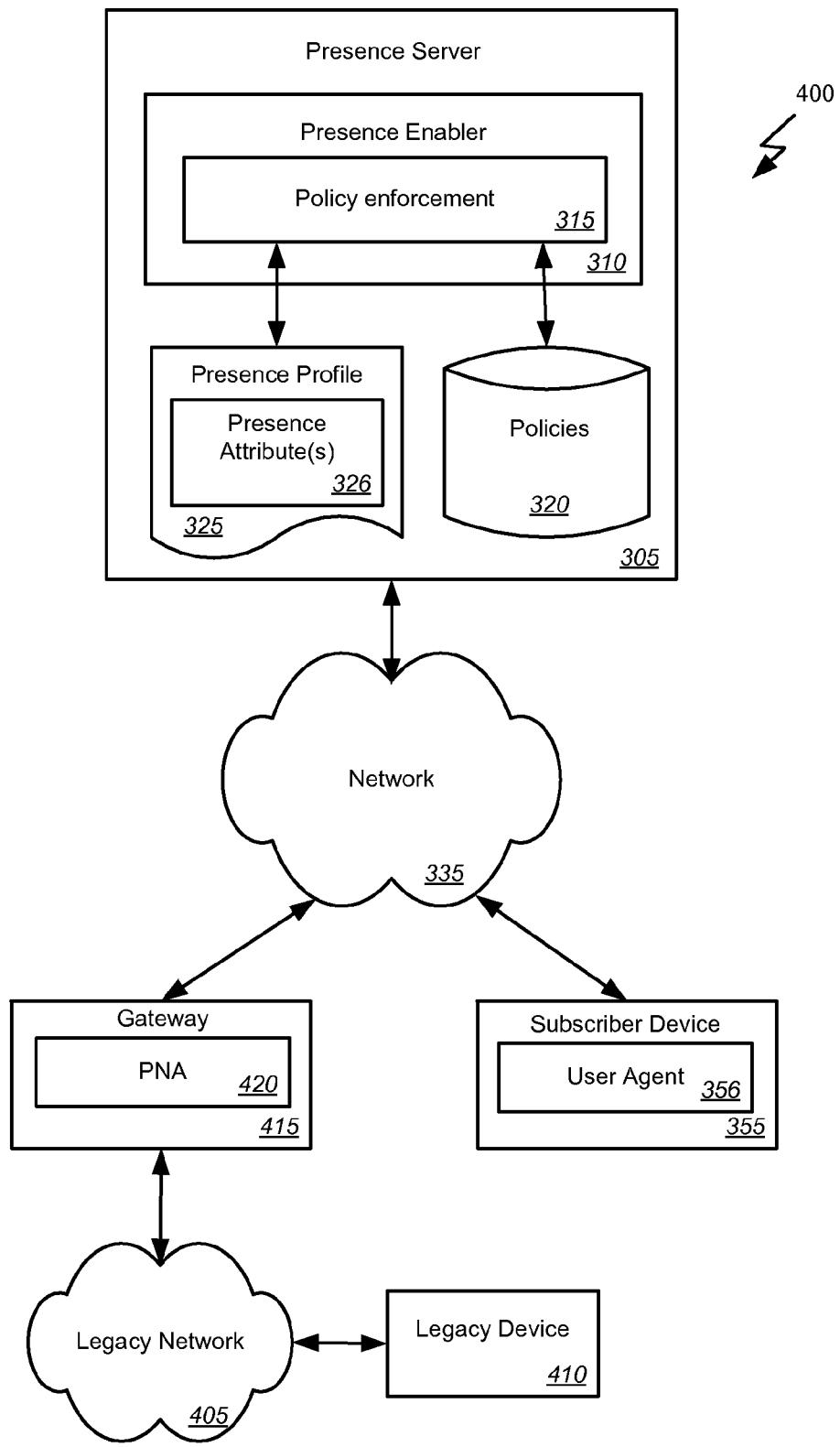
FIG. 4 is a block diagram illustrating the system of FIG. 3 adapted to provide caller identification information according to one embodiment of the present invention.

FIG. 4 is a block diagram illustrating the system of FIG. 3 adapted to provide caller identification information according to one embodiment of the present invention. As illustrated here, the system 400 can include a communication network 335 and presence server 305 as described above. According to embodiments of the present invention, the presence attributes 326 of the presence profile 325 maintained by the presence server 305 can be extended to include an attribute indicating a caller identification, e.g., a telephone number, name, addresses and/or other information identifying a caller or originator of a call or other communication.

In this example, the system 400 includes a subscriber device 355 and user agent 356 as described above. In an implementation according to embodiments of the present invention, the subscriber device 355 can comprise, for example, an IP phone, personal computer, personal digital assistant, or other device. As described above, the user agent 356 of the subscriber device 355 can be adapted to subscribe to and receive notifications of changes to presence attributes 326 or query the presence server 305 for presence attributes 326, i.e., to receive caller identification information for incoming calls to the subscriber device 355. Additionally or alternatively, the user agent 356 of the subscriber device 355 can be adapted to publish one or more presence attributes 326, i.e., to provide caller identification information for outgoing calls from the subscriber device.

The system 400 can also include a gateway 415 or other device or resource communicatively coupled with another network 405 such as a legacy PSTN, IP, or other network. The gateway 415 can include a presence network agent 420. Generally speaking, the gateway 415 and presence network agent 420 can perform functions such as described above with reference to the monitored device 345 and presence network agent 345. That is, the presence network agent 420 of the gateway 415 can be adapted to publish one or more presence attributes 326, i.e., to provide caller identification information for outgoing calls from the gateway 415. For example, when legacy device 410, e.g., a telephone, places a call to subscriber device 355, the gateway 415 can presence network agent 415 can detect the call, determine caller identification information for the legacy device 410 in a manner known in the art, and publish the caller identification information as a presence attribute 326 of a presence profile 325 associated with the subscriber device 355. Additionally or alternatively, the presence network agent 420 of the gateway 415 can be adapted to subscribe to and receive notifications of changes to presence attributes 326 or query the presence server 305 for presence attributes 326, i.e., to receive caller identification information for incoming calls to the gateway 415, legacy network 405 and/or legacy device 410.

Stated another way, a system 400 can comprise a communication network 335 adapted to support a communication session. A presence server 305 can be communicatively coupled with the communication network 335. The presence server 305 can be adapted to receive a publication of one or more presence attributes 326. The one or more presence attributes 326 can comprise at least one attribute indicating caller identification information.

The presence server 305 can update a presence profile 325 associated with an entity, such as an entity associated with subscriber device 355, based on the received presence attributes 326. The entity associated with the presence profile 325 can comprise a party to the communication session, i.e., as either a caller/originator or callee/recipient.

A presence network agent 420 associated with a party to the communication, e.g., legacy device 410, can also be communicatively coupled with the communication network 335. The presence server 305 can receive the publication of the one or more presence attributes 326 from the presence network agent 420 and update the presence profile 325, perhaps according to one or more policies 320 as described above. The system 400 can further comprise an agent 356 associated with an entity such as subscriber device 355 which is in turn associated with the presence profile 325. The presence server 305 can be further adapted to provide the attribute indicating the caller identification information to the agent 356 associated with the subscriber device 355. For example, the presence server 305 can provide the attribute indicating the caller identification information to the agent 356 associated with the subscriber device 355 by providing a notification of a change in the attribute indicating the caller identification information. In another example, the presence server 305 can be adapted to receive a request or query from the agent 356 associated with the subscriber device 355 for at least one of the presence attributes 326 of the presence profile 325. In such a case, the presence server 305 can provide the attribute indicating the caller identification information to the subscriber device 355 in response to the request. In either case, the agent 356, user interface, or other application of the subscriber device 355 can then provide the caller identification information, and perhaps other information from one or more presence attributes 326, to a user of the subscriber device 355, e.g., via a pop-up or other indication.

As noted above, embodiments of the present invention also provide for utilizing caller identification information for calls originating from the subscriber device 355. In such cases, the presence server 305 can receive the publication of the one or more presence attributes 326 from the agent 356 associated with the subscriber device 355. In such cases, the presence server 305 can be further adapted to provide the attribute indicating the caller identification information to the agent associated with the recipient, such as legacy device 410, of the communication session, i.e., the presence network agent 420 of the gateway 415. For example, the presence server 305 can provide the attribute indicating the caller identification information to the agent 420 associated with the recipient 410 by providing a notification of a change in the attribute indicating the caller identification information. In another example, the presence server 305 can be further adapted to receive a request or query from the agent 420 associated with the recipient 410 for at least one of the presence attributes 326 of the presence profile 325. In such cases, the presence server 305 can provide the attribute indicating the caller identification information to the agent 420 associated with the recipient 410 in response to the request.

As described above, the presence server 305 can be further adapted to persist the attribute indicating the caller identification information based on one or more policies 305. Furthermore, the presence serer 305 can be adapted to expire the attribute indicating the caller identification information based on one or more policies 320. Based one the persisted attributes, the presence server 305 can be further adapted to log communications, bill for communications, etc. Additionally or alternatively, the one or more presence attributes 326 can comprise one or more attributes indicating a status of a device, e.g., an on-hook or off-hook condition for the subscriber device 355, one or more attributes indicating presence information, and/or other attributes.

Thus, it should be understood that the user agent 356 of the subscriber device 355 can be adapted to handle incoming or outgoing calls. Similarly, the presence network agent 420 of the gateway 415 can be adapted to handle incoming or outgoing calls to or from the legacy device 410. Therefore, the following description refers to a "caller's agent" and a "callee's agent" to refer to either the presence network agent 420 of the gateway 415 or the user agent 356 of the subscriber device 355 depending upon whether the legacy device 410 or the subscriber device 355 is originating the call.

Figure 5:
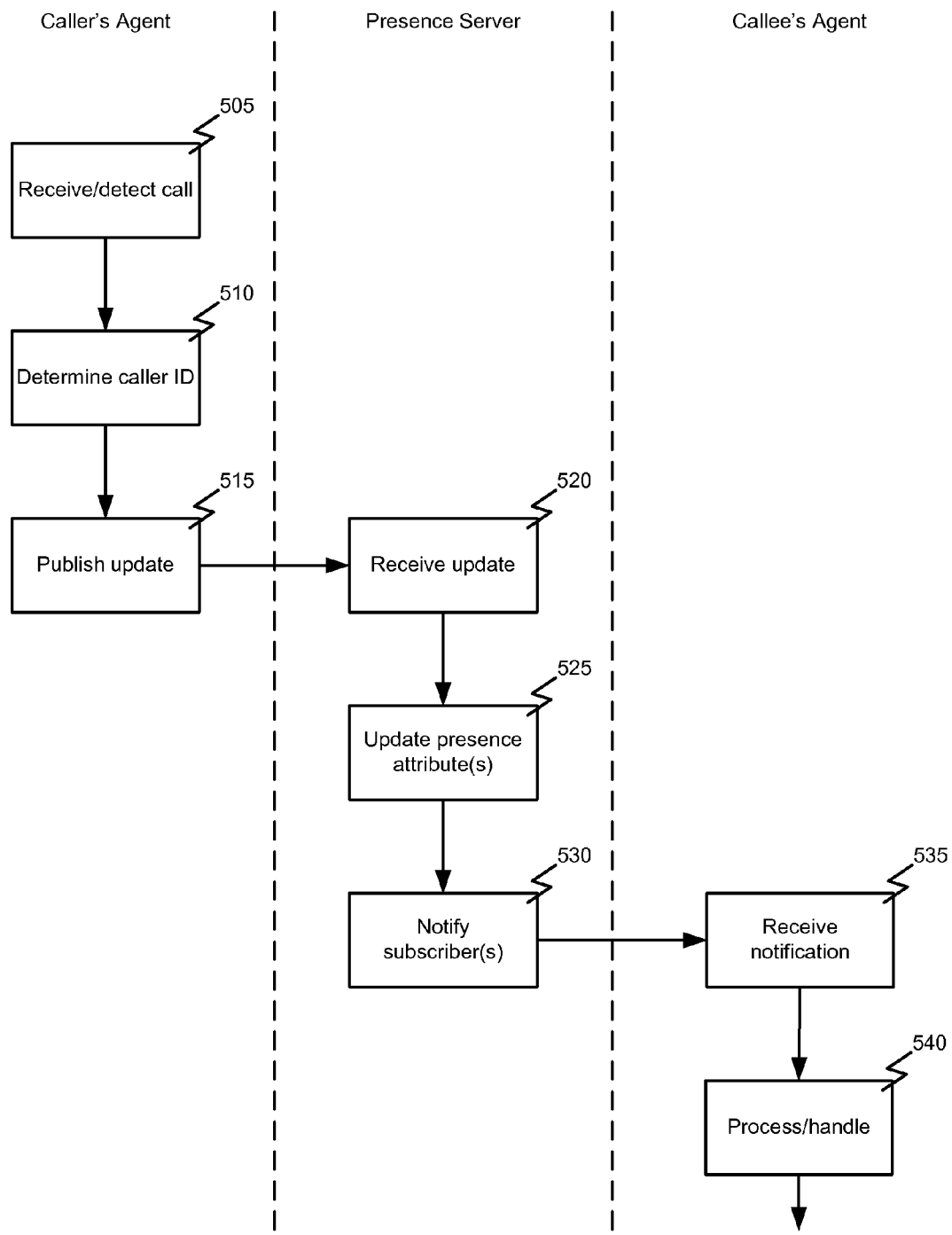
FIG. 5 is a flowchart illustrating a process for providing caller identification information according to one embodiment of the present invention.

FIG. 5 is a flowchart illustrating a process for providing caller identification information according to one embodiment of the present invention. In this example, the process begins with the caller's agent receiving or detecting 505 a call or communication and determining 510 caller identification information. Receiving or detecting 505 a call and determining 510 caller identification information can be performed by any means as is commonly known in the art. The caller's agent can then publish 515 an update of one or more presence attributes indicating caller identification information relating caller. The publication 515 can be performed via any appropriate message of the underlying protocol of the presence network as described herein.

The presence service can receive 520 the publication of one or more presence attributes from the caller's agent. A presence profile associated with a party to the communication, i.e., either the caller or the callee, can be updated 525 based on the received presence attributes. As noted above one or more policies can be applied to the presence attributes by the presence service. Therefore, updating 525 the presence profile can be based on applying the one or more policies. The presence attribute indicating the caller identification information can be provided 530 to the callee's agent, i.e., a notification can be sent to the callee's agent. Providing 530 the presence attribute to the callee's agent can also be based at least in part on applying the one or more policies. That is, one or more policies can be applied to determine, for example, which callee's agent is to be notified, how it are to be notified, over what channels, how the attribute is to be provided, transformed, etc. The notification can be provided 530 to the callee's agent via any appropriate message of the underlying protocol of the presence network as described herein.

The callee's agent can receive 535 the notification from the presence server. As noted above, the callee's agent can include a handler or other application or process for further handling 540 of the notification. That is, the listener may perform further processing 540 to, for example, inform a user of the notification, initiate a communication, perform actions to control a process based on the notification, transform the caller identification information, route the call, etc.

Figure 6:
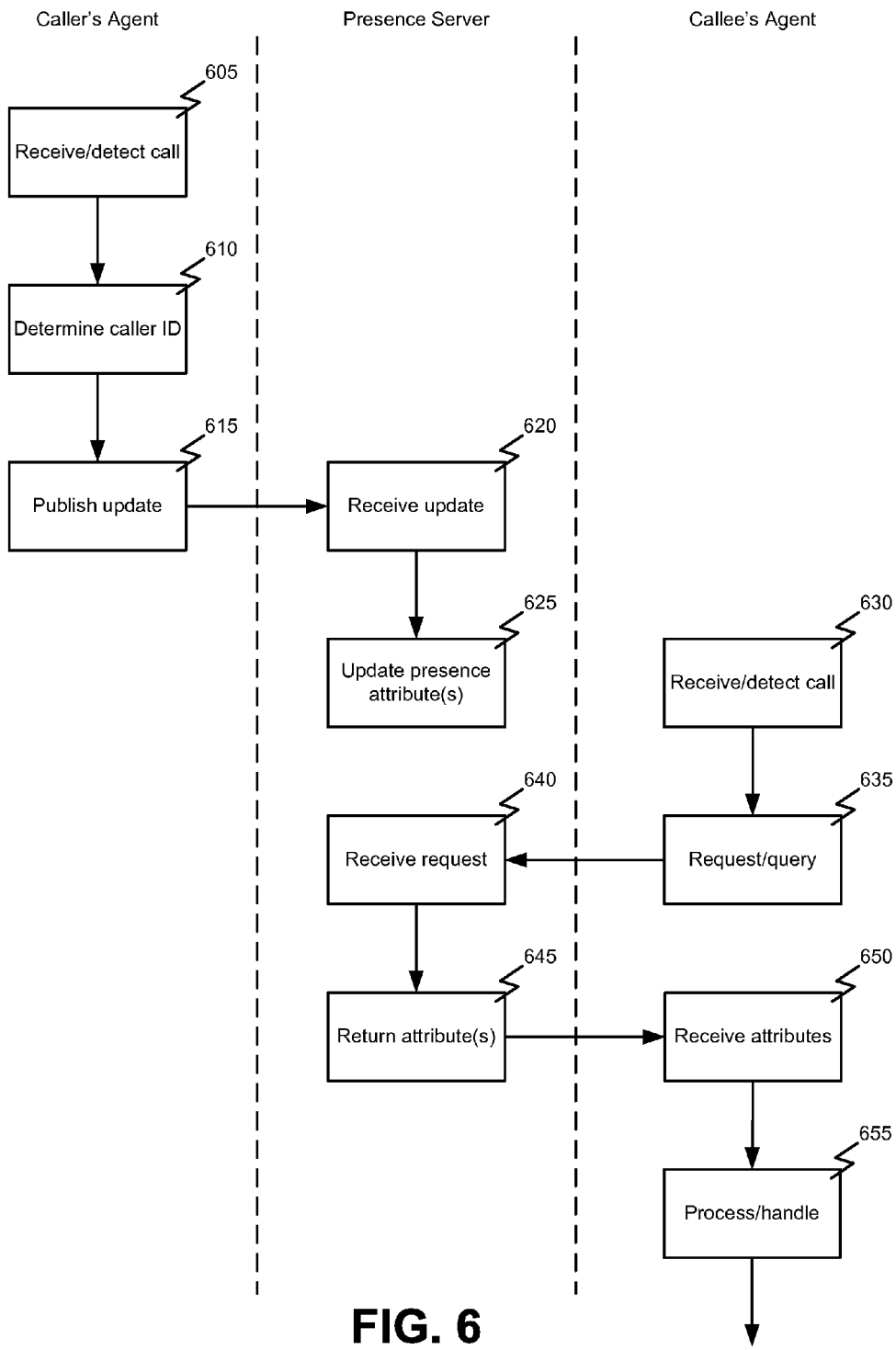
FIG. 6 is a flowchart illustrating a process for providing caller identification information according to an alternative embodiment of the present invention.

FIG. 6 is a flowchart illustrating a process for providing caller identification information according to an alternative embodiment of the present invention. In this example, the process begins with the caller's agent receiving or detecting 605 a call or communication and determining 610 caller identification information. Receiving or detecting 605 a call and determining 610 caller identification information can be performed by any means as is commonly known in the art. The caller's agent can then publish 615 an update of one or more presence attributes indicating caller identification information relating caller. The publication 615 can be performed via any appropriate message of the underlying protocol of the presence network as described herein.

The presence service can receive 620 the publication of one or more presence attributes from the caller's agent. A presence profile associated with a party to the communication, i.e., either the caller or the callee, can be updated 625 based on the received presence attributes. As noted above one or more policies can be applied to the presence attributes by the presence service. Therefore, updating 625 the presence profile can be based on applying the one or more policies.

The callee's agent can then receive or detect 630 the call or otherwise be triggered. In response, the callee's agent may request 635 or query the presence service for one or more of the presence attributes. The request 635 can be made via any appropriate message of the underlying protocol of the presence network as described herein. The presence server can receive 640 the request and can, in response, return 645 one or more presence attributes, including the presence attribute indicating caller identification. As noted above one or more policies can be applied to the presence attributes by the presence service. Therefore, returning 645 one or more presence attributes can be based on applying the one or more policies. That is, one or more policies can be applied to determine, for example, whether the request is authorized to receive the requested attributes, how they are to be returned, over what channels, how the attribute is to be transformed, if a t all, etc.

The callee's agent can receive 650 the attribute(s) from the presence server. As noted above, the callee's agent can include a handler or other application or process for further handling 655 of the attribute(s). That is, the callee's agent may perform further processing 655 to, for example, inform a user via a pop-up display, audio indication, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing information related to a communication, the method comprising:
    receiving, by a presence server, a publication of one or more presence attributes, the one or more presence attributes comprising at least one attribute indicating caller identification information and including a phone number of an originator of the communication;
    updating, by the presence server, a presence profile maintained by the presence server and associated with an intended recipient of the communication based on the received presence attributes, wherein the presence profile comprises one or more attributes indicating presence information related to the intended recipient of the communication and one or more attributes indicating information other than presence information and wherein updating the presence profile maintained by the presence server and associated with the intended recipient of the communication based on the received presence attributes comprises updating at least one of the attributes indicating information other than presence information based the received caller identification information; and
    providing, by the presence server, the attribute indicating the caller identification information to the intended recipient of the communication as a caller identifier (ID) of the originator of the communication.

2. The method of claim 1, wherein receiving the publication of the one or more presence attributes comprises receiving the one or more presence attributes from an agent associated with the originator of the communication.

3. The method of claim 2, wherein providing the attribute indicating the caller identification information to the intended recipient of the communication comprises providing a notification of a change in the attribute indicating the caller identification information.

4. The method of claim 2, further comprising receiving, by the presence server, a request from the intended recipient of the communication for at least one of the presence attributes of the presence profile and wherein providing the attribute indicating the caller identification information to the intended recipient of the communication is performed in response to the request.

5. The method of claim 1, further comprising providing, by the presence server, the attribute indicating the caller identification information to an authorized principal.

6. The method of claim 1, wherein receiving the publication of the one or more presence attributes comprises receiving the one or more presence attributes from an agent associated with the originator of the communication.

7. The method of claim 6, wherein providing the attribute indicating the caller identification information to the recipient comprises providing a notification of a change in the attribute indicating the caller identification information to an agent associated with the recipient.

8. The method of claim 6, further comprising receiving, by the presence server, a request from an agent associated with the recipient for at least one of the presence attributes of the presence profile and wherein providing the attribute indicating the caller identification information to the recipient is performed in response to the request.

9. The method of claim 1, further comprising providing, by the presence server, the attribute indicating the caller identification information to an authorized principal.

10. The method of claim 1, further comprising persisting, by the presence server, the attribute indicating the caller identification information based on one or more policies.

11. The method of claim 10, further comprising expiring, by the presence server, the attribute indicating the caller identification information based on one or more policies.

12. The method of claim 10, further comprising logging, by the presence server, communications based on the persisted attribute indicating the caller identification information.

13. The method of claim 10, further comprising billing for communications based on the persisted attribute indicating the caller identification information.

14. The method of claim 1, wherein the one or more presence attributes further comprise at least one attribute indicating a status of a device associated with the entity.

15. A system comprising:
    a communication network adapted to support a communication session;
    a presence server communicatively coupled with the communication network, the presence server receiving a publication of one or more presence attributes, the one or more presence attributes comprising at least one attribute indicating caller identification information and including a phone number of an originator of the communication, updating a presence profile maintained by the presence server and associated with an intended recipient of the communication based on the received presence attributes, wherein the presence profile comprises one or more attributes indicating presence information related to the intended recipient of the communication and one or more attributes indicating information other than presence information and wherein updating the presence profile maintained by the presence server and associated with the intended recipient of the communication based on the received presence attributes comprises updating at least one of the attributes indicating information other than presence information based on the received caller identification information, and providing the attribute indicating the caller identification information to the intended recipient of the communication as a caller identifier (ID) of the originator of the communication.

16. A machine-readable memory device comprising a set of instructions stored thereon which, when executed by a processor, cause the processor to provide information related to a communication by:

receiving, by a presence server, a publication of one or more presence attributes, the one or more presence attributes comprising at least one attribute indicating caller identification information and including a phone number of an originator of the communication;

updating, by the presence server, a presence profile maintained by the presence server and associated with an intended recipient of the communication based on the received presence attributes, wherein the presence profile comprises one or more attributes indicating presence information related to the intended recipient of the communication and one or more attributes indicating information other than presence information and wherein updating the presence profile maintained by the presence server and associated with the intended recipient of the communication based on the received presence attributes comprises updating at least one of the attributes indicating information other than presence information based the received caller identification information; and providing, by the presence server, the attribute indicating the caller identification information to the intended recipient of the communication as a caller identifier(ID) of the originator of the communication.

* * * * *